US008639946B2

(12) United States Patent
Baker

(10) Patent No.: US 8,639,946 B2
(45) Date of Patent: Jan. 28, 2014

(54) SYSTEM AND METHOD OF USING A PROTECTED NON-VOLATILE MEMORY

(75) Inventor: David Cureton Baker, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 1458 days.

(21) Appl. No.: 11/166,872

(22) Filed: Jun. 24, 2005

(65) Prior Publication Data

US 2006/0294397 A1 Dec. 28, 2006

(51) Int. Cl.
*G06F 21/00* (2013.01)

(52) U.S. Cl.
USPC .......................................... 713/193; 713/186

(58) Field of Classification Search
USPC .................. 713/186, 193, 200, 201
See application file for complete search history.

(56) References Cited

U.S. PATENT DOCUMENTS

| | | | | |
|---|---|---|---|---|
| 4,489,380 | A | * | 12/1984 | Carey et al. .................... 711/152 |
| 5,111,504 | A | | 5/1992 | Esserman et al. |
| 5,357,573 | A | * | 10/1994 | Walters .......................... 713/193 |
| 5,421,006 | A | * | 5/1995 | Jablon et al. ...................... 714/36 |
| 5,481,611 | A | | 1/1996 | Owens et al. |
| 5,835,594 | A | | 11/1998 | Albrecht et al. |
| 6,098,171 | A | | 8/2000 | Johnson et al. |
| 6,125,054 | A | * | 9/2000 | Yusa et al. ................. 365/185.04 |
| 6,218,941 | B1 | | 4/2001 | Cromer et al. |
| 6,266,271 | B1 | | 7/2001 | Kawamura |
| 6,351,813 | B1 | * | 2/2002 | Mooney et al. ................ 713/185 |
| 6,401,208 | B2 | | 6/2002 | Davis et al. |
| 6,487,465 | B1 | | 11/2002 | Dayan et al. |
| 6,510,521 | B1 | | 1/2003 | Albrecht et al. |
| 6,535,976 | B1 | * | 3/2003 | Hoggarth et al. .................. 713/2 |
| 6,629,192 | B1 | | 9/2003 | Schaefer et al. |
| 6,717,839 | B1 | | 4/2004 | Du |
| 6,728,379 | B1 | * | 4/2004 | Ishibashi et al. ............... 380/278 |
| 6,775,776 | B1 | * | 8/2004 | Vogt et al. ...................... 713/186 |
| 6,874,069 | B2 | * | 3/2005 | Lin et al. ........................ 711/156 |
| 6,983,281 | B1 | * | 1/2006 | Utsumi .......................... 707/101 |
| 7,133,990 | B2 | | 11/2006 | Link et al. |

(Continued)

FOREIGN PATENT DOCUMENTS

| | | |
|---|---|---|
| GB | 2353617 A | 2/2001 |
| JP | 01232452 A | 9/1989 |

(Continued)

OTHER PUBLICATIONS

Office Action of the Intellectual Property Office (Taiwan), Search Report for Patent Application, Nov. 13, 2008, ROC (Taiwan) Patent Application No. 094134411, 5 pgs.

(Continued)

*Primary Examiner* — Joseph P. Hirl
*Assistant Examiner* — John B King
(74) *Attorney, Agent, or Firm* — Toler Law Group, PC

(57) ABSTRACT

The disclosure includes a system and method of using a processor and protected memory. In a particular embodiment, the system includes a processor, a volatile memory accessible to the processor, and a first nonvolatile memory accessible to the processor. The first nonvolatile memory includes a first portion of memory that is protected and is readable when a shield bit indicates an unshielded mode of operation, but is unreadable when the shield bit indicates a shielded mode of operation and a second portion of memory that is unprotected and that is readable regardless of the value of the shield bit. The system includes a second nonvolatile memory including data to be transferred to the volatile memory.

22 Claims, 3 Drawing Sheets

(56) References Cited

U.S. PATENT DOCUMENTS

| | | | |
|---|---|---|---|
| 7,209,642 B1* | 4/2007 | Utsumi | 386/94 |
| 7,363,494 B2* | 4/2008 | Brainard et al. | 713/168 |
| 2002/0184523 A1 | 12/2002 | Barrenscheen | |
| 2003/0037237 A1 | 2/2003 | Abgrall et al. | |
| 2003/0140238 A1 | 7/2003 | Turkboylari | |
| 2003/0196054 A1 | 10/2003 | Rabeler | |
| 2004/0003273 A1* | 1/2004 | Grawrock et al. | 713/193 |
| 2004/0193742 A1* | 9/2004 | Ikeda | 710/1 |
| 2004/0243978 A1 | 12/2004 | Walmsley | |
| 2005/0066168 A1 | 3/2005 | Walmsley | |
| 2005/0289355 A1* | 12/2005 | Kitariev et al. | 713/182 |
| 2006/0193475 A1* | 8/2006 | Borke | 380/285 |

FOREIGN PATENT DOCUMENTS

| | | |
|---|---|---|
| TW | 469432 | 12/2001 |
| TW | 480443 | 3/2002 |
| WO | WO 2004/008321 | 1/2004 |
| WO | WO 2004/008321 A1 | 1/2004 |

OTHER PUBLICATIONS

Examination Report under Section 18(3), Intellectual Property Office (United Kingdom), Feb. 23, 2010, Patent Application No. GB0520101.7, 5 pgs.

English Language Translation of Taiwanese Patent No. 469432 (Abstract Only) [1 pg], Published Dec. 21, 2001.

Search Report under Section 17; GB Application No. GB0520101.7, The Patent Office—United Kingdom; Jan. 27, 2006; (2 pgs).

Written Opinion of the International Searching Authority; International Application No. PCT/US05/33572; International Searching Authority; Jun. 27, 2007; (3 pgs).

International Preliminary Report on Patentability; International Application No. PCT/US2005/033572, The International Bureau of WIPO; Dec. 24, 2007; (4 pgs).

International Search Report, International Application No. PCT/US05/33572; International Searching Authority; Jun. 27, 2007; (4 pgs).

* cited by examiner

SYSTEM AND METHOD OF USING A PROTECTED NON-VOLATILE MEMORY

FIELD OF THE DISCLOSURE

The present disclosure relates generally to use of protected non-volatile memory.

BACKGROUND

Electronic device providers that use software programmable devices have concerns related to software security. To address these security concerns, such devices often use security techniques such as authentication and encryption. While authentication and encryption are useful tools, such methods rely upon the protection of one or more keys that are used to authenticate or decrypt program data. Often the keys needed to be protected are stored within a memory, such as a non-volatile memory, of the electronic device that is sold and deployed. Upon deployment of the electronic device or even during development, the memory containing the keys may be accessed by unauthorized third parties causing a security risk. Thus, there is a need for an improved system and method of protecting the security of software program data and the associated keys to security programs that protect the program data, where such keys are stored in non-volatile memory.

DETAILED DESCRIPTION OF THE DRAWINGS

Figure 1:
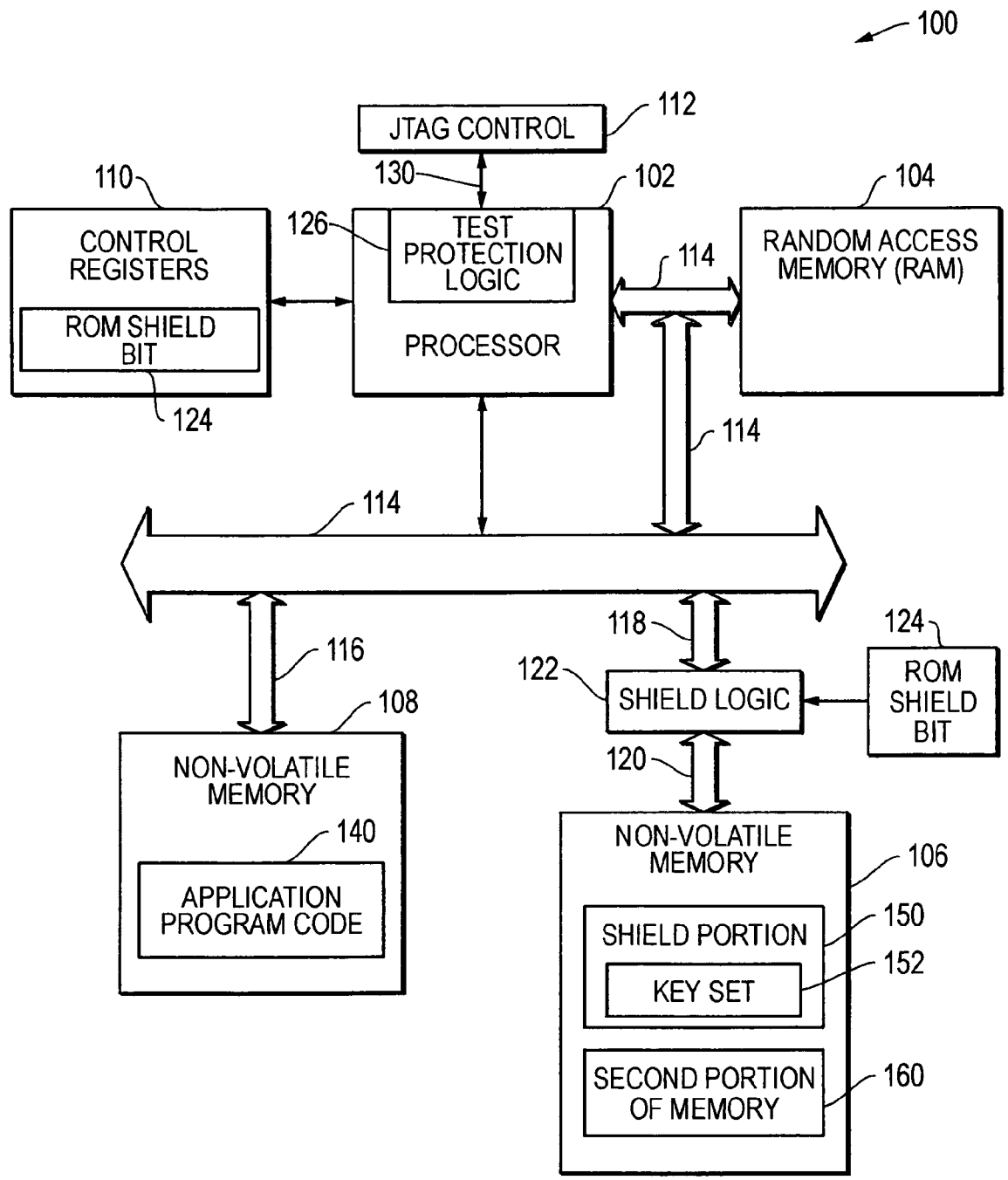
FIG. 1 is a block diagram that illustrates a system that has access to a partially protected non-volatile memory device.

Referring to FIG. 1, a data processing system 100 is shown. The system 100 includes a processor device 102, a volatile memory 104, a first non-volatile memory 106, and a second non-volatile memory 108. The system 100 also includes control registers 110 and a JTAG interface 130 to a JTAG control module 112. The processor device 102 is coupled for access to the control registers 110 and has an input to receive an external test clock input over the JTAG interface 130. The processor device 102 includes test protection logic 126 that interfaces to the JTAG test interface 130. The processor device 102 is coupled to the volatile memory 104 via a memory bus 114. In a particular embodiment, the volatile memory 104 is a random access memory (RAM) device. The processor device 102 is coupled to the first non-volatile memory 106 via the memory bus 114 and via intermediate shield logic 122. The shield logic 122 couples the first non-volatile memory 106 to the memory bus 114 and has an input of a ROM shield bit 124. The ROM shield bit 124 may be stored and programmed as one of the controls registers 110 or may be implemented in a separate write-once memory device. The processor device 102 is coupled to the second non-volatile memory 108 via the memory bus 114. The first non-volatile memory 106 includes a first interface 120 to shield logic 122 and an external interface 118 to the memory bus 114. The second non-volatile memory 108 includes an interface 116 to the memory bus 114.

The first non-volatile memory 106 includes a first shielded portion of memory 150 that is a shielded portion and a second portion of memory 160. The shielded portion 150 includes a stored key set data 152. In a particular embodiment, the key data 152 includes an authentication key, an encryption key, key set extraction data, and key set extraction program logic needed to retrieve and use the key set information. The second non-volatile memory 108 may be implemented in a particular embodiment as a flash memory and includes data, such as boot program code 140. In a particular embodiment, the first non-volatile memory 106 may be implemented as a read-only memory (ROM).

In a particular embodiment, the boot program code 140 includes a plurality of interspersed authentication words. The plurality of authentication words are used during a transfer of the boot program code from the second non-volatile memory 108 to the random access memory 104 and provides a method of authenticating the validity of the boot program code to detect third party unauthorized use or hacking attempts. In a particular embodiment, the authentication words are assessed and validated using an authentication key found within the key set 152 of the shielded portion 150 of the non-volatile memory 106.

During operation, upon power up of the system 100, the shielded portion 150 of the non-volatile memory 106 is in an unshielded mode that allows for read access to the key set 152. During initialization in the unshielded mode, the processor 102 may retrieve the key set 152 and may use the keys within the key set to perform a transfer process where the application program code 140 is transferred from the second non-volatile memory 108 to the random access memory 104. The key set may include both an authentication key and/or a decryption key. The authentication key may be used to authenticate the validity of the program code and to access and compare transferred data with first authentication words, and the decryption key may be used to decrypt the program code if such code has been previously encrypted. Thus, the key set 152 may be used by the processor device 102 to provide for a secure initial transfer of the program code 140 from the non-volatile memory 108 to the random access memory 104.

After the program code has been transferred into the random access memory 104, but before execution of the program code by the processor 102, the ROM shield bit 124 may be set by the processor 102. By setting the ROM shield bit 124, the shielded portion 150 of the first non-volatile memory 106 enters a shielded mode where the key set 152 is unreadable. In this situation, the shield logic 122 prevents access to the shielded portion 150 of the first non-volatile memory 106 and instead may provide an error code or a fixed value that indicates the shielded and unreadable memory condition. After the ROM shield bit 124 has been set and the shielded portion 150 of the first non-volatile memory 106 enters the shield mode to restrict access to the key set 152, the processor device 102 may transition from a supervisory mode to a user operator mode and may then execute instructions from the random access memory 104. Thereafter, the processor device 102 in the user mode executes instructions during normal operation. During the user execution mode and normal operation, it should be noted that the shielded portion 150 remains in the shielded mode thereby restricting access to the key set 152. Thus, the ROM shield bit 124 and the shielded portion 150 of the first non-volatile memory 106, together with the key set 152, provides for enhanced security of the program code transfer to the random access memory 104.

An unauthorized third party may attempt access to the key set 152 via a test interface such as the JTAG control interface 130. To restrict such unauthorized access, the processor device 102 includes the test protection logic 126. The test protection logic 126 is responsive to an external clock input and may detect an attempted unauthorized access of the shielded portion 150. In a particular embodiment, the processor device 102, in response to detection by the test protection logic 126 of a number of clock cycles exceeding a threshold, may set the ROM shield bit 124. In a particular example, the detection threshold is less than forty clock cycles, such as a setting of twenty clock cycles. In the case of a JTAG instruction, the minimum JTAG instruction would require a number of clock cycles that is greater than twenty. Thus, the threshold of less than forty and preferably twenty clock cycles may be used to detect and then respond to an unauthorized attempt to access the key set 152 via the JTAG interface.

Figure 2:
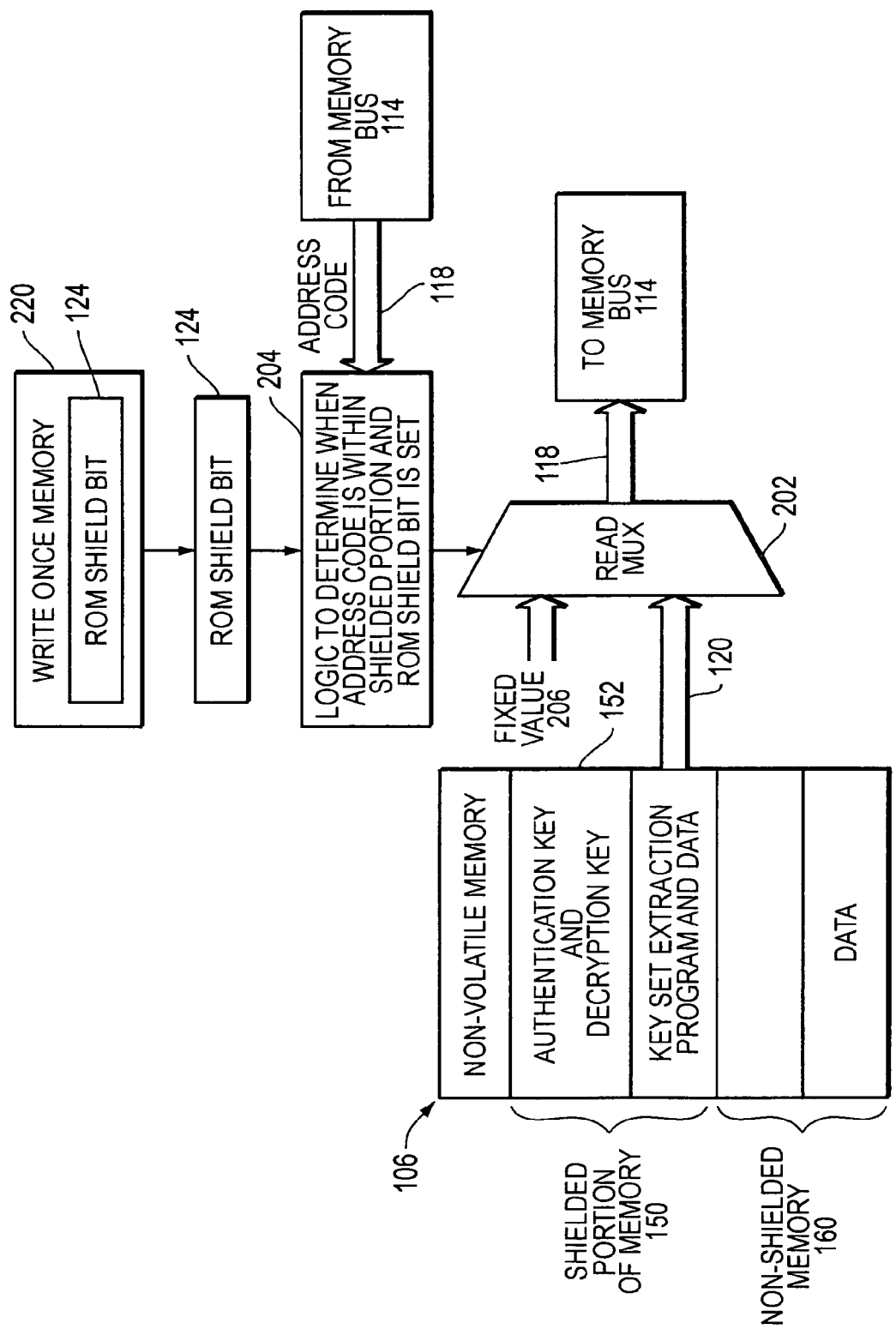
FIG. 2 is a block diagram that provides further details of a portion of the system of FIG. 1.

Referring to FIG. 2, a particular embodiment of a portion of the system 100 that illustrates functionality of the first non-volatile memory 106 and the shield logic 122 is shown. The first non-volatile memory 106 is coupled to a read multiplexer (MUX) 202 via a first interface 120. The MUX 202 is coupled to the memory bus 114 via interface 118. The MUX 202 has an input of a fixed value 206 that may be an error code or other indication of a shielded condition. The MUX 202 includes a select input that is provided by logic module 204. The logic module 204 is responsive to a ROM shield bit 124 that may be provided by a write once memory 220. The logic module 204 is also responsive to an address code 118 provided from the memory bus 114 via the memory interface 118.

During operation, the ROM shield bit 124 is provided to the logic module 204 to indicate the state of the shielded portion 150 of the non-volatile memory 106. The logic module 204 also receives addresses from the memory bus 114. When the address requested from the memory bus 114 is outside of the shielded portion of memory 150, then data, such as boot program or other data from within the non-shielded portion of memory 160, is provided from the first non-volatile memory 106 through the MUX 202 to the memory bus 114 over interface 118.

However, when the address requested from the memory bus 114 is an address within the shielded portion of memory 150 and when the ROM shield bit has been set, the logic module 204 provides a selector to the MUX 202 to only provide the fixed value 206 as an output over interface 118 to the memory bus 114. In this condition, the contents of the shielded portion of the memory 150 are in a security shielded state and are protected from access. In addition, to avoid unauthorized modifications to the ROM shield bit 124, the ROM shield bit may be stored and programmed in a write once memory 220. With a write once memory, once the ROM shield bit has been set, the memory may not be modified. Use of the write once memory thereby provides enhanced security for maintaining shielding of the first portion 150 of the non-volatile memory 106. In a particular embodiment, the shielded portion of memory 150 includes an authentication key, a decryption key, and a key set extraction program and data as needed for retrieval of the key set from the non-volatile memory during the non-shielded operating mode. Thus, the non-volatile memory 106 includes a first portion of memory 150 that is protected and is readable when a shield bit indicates an unshielded mode of operation, but is unreadable when the shield bit indicates a shielded mode of operation. In addition, the non-volatile memory 106 includes a second portion 160 that is unprotected and that is readable regardless of the value of the shield bit 124.

Figure 3:
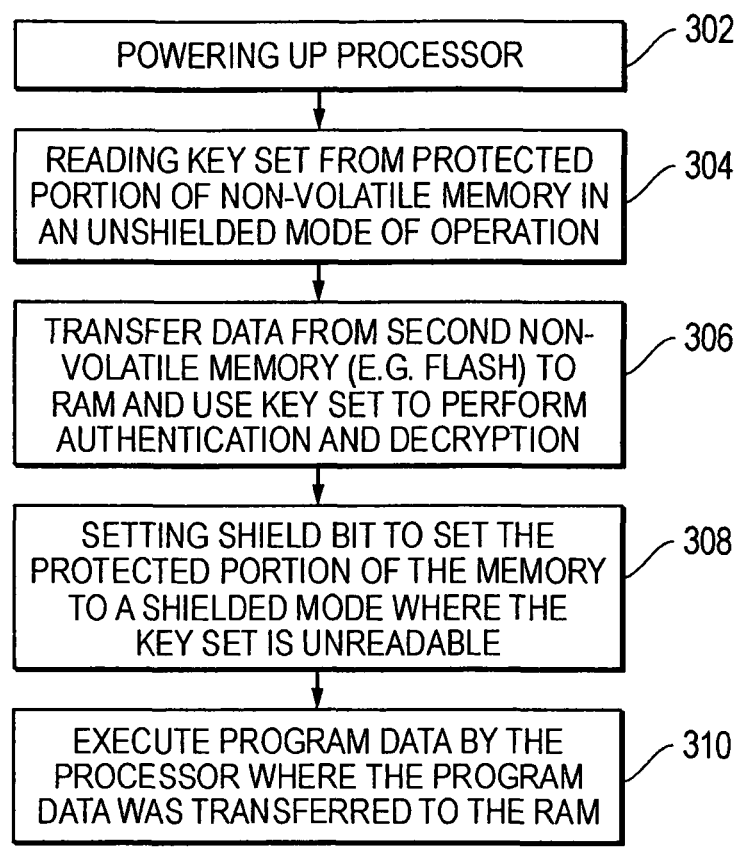
FIG. 3 is a flow chart of a method of activating a processor device having access to a partially protected non-volatile memory.

Referring to FIG. 3, a method of activating a processor device having access to a non-volatile memory is shown. The method includes powering up the processor device, as shown at 302. In a particular embodiment, the processor device is coupled to a read only memory (ROM) that has a protected portion of memory that is shieldable but where the protected portion is in an unshielded mode upon power up. The method further includes reading key set data from the protected portion of the non-volatile memory that is in the unshielded mode of operation, as shown at 304, and transferring data from a second non-volatile memory, such as a flash memory, to a main memory, such as a random access memory (RAM). This step also includes accessing key set extraction data and using the key set extraction data and program logic to access the key set to perform authentication and decryption operations as needed for transfer of the data, as shown at 306. In a particular illustrative example, the transferred data is an application program that includes program instructions to be executed by the processor.

The method further includes setting a shield bit to thereby set the protected portion of the non-volatile memory to a shield mode where the key set is unreadable. The protected portion of the memory is set to the shielded mode after the data transfer has been completed but prior to execution of the transferred program code in the RAM by the processor.

The method further includes executing program data by the processor where such program data includes instructions that were transferred to the RAM, as shown at 310. During program code execution by the processor from the RAM, the processor device may be executing in a user mode and in such user mode the shielded portion of the non-volatile memory remains set to prevent unauthorized access to the key set. Thus, the illustrated method of activating the processor device provides for an initial secured transfer of program code from a non-volatile memory to random access memory useable by the processor device.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
  a processor;
  a volatile memory accessible to the processor;
  a first nonvolatile memory accessible to the processor, the first nonvolatile memory including:
    a first portion of memory that is protected and that is accessible during power up of the system when a shield bit indicates an unshielded mode of operation, but, after the first portion of memory is accessed and before execution of program code by the processor, the first portion of memory is inaccessible when the shield bit indicates a shielded mode of operation; and
    a second portion of memory that is unprotected and that is readable regardless of a value of the shield bit;
  a second nonvolatile memory, the second nonvolatile memory including the program code to be transferred to the volatile memory; and
  external test interface protection logic responsive to an external test clock input, wherein the shield bit is set to the shielded mode of operation after detection that a number of cycles of the external test clock input exceeds a threshold;
  wherein a key set is stored within the first portion of memory, the key set comprising an authentication key to authenticate the program code and a decryption key to decrypt the program code when the program code is encrypted.

2. The system of claim 1, wherein the program code includes a plurality of authentication words.

3. The system of claim 1, wherein the threshold is less than 40 clock cycles.

4. The system of claim 3, wherein the threshold is 20 clock cycles and wherein the external test clock input is a Joint Test Action Group (JTAG) clock associated with a JTAG instruction.

5. The system of claim 1, wherein the key set is associated with a unique product manufacturer.

6. The system of claim 1, wherein the second portion of memory of the first nonvolatile memory includes audio data.

7. The system of claim 1, wherein the first nonvolatile memory is read only memory and the second nonvolatile memory is flash memory.

8. The system of claim 1, wherein the threshold is less than 20 clock cycles.

9. The system of claim 1, further comprising a write once memory device to store the shield bit.

10. A memory device comprising:
a shield bit storage;
a first memory, the first memory including:
a first portion that is protected and that is accessible based on a value of a shield bit from the shield bit storage, and
a second portion that is unprotected and that is accessible independent of the value of the shield bit; and
a second memory to store program code;
wherein the first portion of the first memory includes a key set comprising an authentication key to authenticate the program code and a decryption key to decrypt the program code when the program code is encrypted;
wherein the value of the shield bit at power up of the memory device indicates an unshielded mode of operation that allows access to the first portion of the first memory; and
wherein the value of the shield bit is changed to indicate a shielded mode of operation where the first portion of the first memory is inaccessible when a number of test cycles of an external test clock input exceeds a threshold.

11. The memory device of claim 10, further comprising a read multiplexer coupled to the first portion of the first memory, the multiplexer controlled at least in part in response to the shield bit.

12. The memory device of claim 11, wherein the multiplexer outputs a data output value from the first portion of the first memory during the unshielded mode of operation and wherein the multiplexer outputs a fixed output value indicating an error condition during the shielded mode of operation.

13. The memory device of claim 10, wherein the shield bit storage comprises a write once memory device so that the shield bit is not user modifiable after a single write operation.

14. The memory device of claim 10, wherein the value of the shield bit is changed to indicate the shielded mode of operation after the first portion of the first memory is accessed but before execution of the program code by a processor.

15. A method comprising:
powering up a processor device having access to a memory device, wherein the memory device comprises:
a shield bit storage including a shield bit;
a first memory including:
a protected portion that is accessible based on a value of the shield bit, wherein the protected portion is in an unshielded mode upon powerup of the processor device, wherein the protected portion is accessible to the processor conditioned on the protected portion being in the unshielded mode, and wherein the protected portion is inaccessible to the processor when the protected portion is in a shielded mode, and
an unprotected portion that is accessible to the processor independent of the value of the shield bit; and
a second memory configured to store program code,
wherein the protected portion includes a key set comprising:
an authentication key to authenticate the program code, and
a decryption key to decrypt the program code when the program code is encrypted; and
changing a mode from the unshielded mode to the shielded mode in response to a number of test cycles of an external clock input detected at the processor device exceeding a threshold.

16. The method of claim 15, wherein the key set is readable when the protected portion is in the unshielded mode.

17. The method of claim 15, wherein the shield bit is stored in a write once memory.

18. The method of claim 15, further comprising:
reading the key set from the protected portion when the mode is the unshielded mode; and
changing the mode from the unshielded mode to the shielded mode after transfer of data associated with the protected portion and before a processor of the processor device executes the program code.

19. The method of claim 15, wherein the threshold is less than 20 clock cycles.

20. The method of claim 18, wherein the first memory includes read only memory, and wherein the second memory includes flash memory.

21. The method of claim 15, further comprising:
receiving an attempt to access the protected portion when the protected portion is in the shielded mode; and
returning an indication of a shielded and unreadable memory condition in response to the attempt.

22. The method of claim 15, wherein the threshold is less than 40 clock cycles.

* * * * *